United States Patent [19]

Ersoy et al.

[11] Patent Number: 5,214,978
[45] Date of Patent: Jun. 1, 1993

[54] STEERING COLUMN FOR MOTOR VEHICLES

[75] Inventors: Metin Ersoy, Walluf; Jens Vortmeyer, Preus. Oldendorf, both of Fed. Rep. of Germany

[73] Assignee: Lemforder Metallwaren AG, Lemforde, Fed. Rep. of Germany

[21] Appl. No.: 830,299

[22] Filed: Jan. 31, 1992

[30] Foreign Application Priority Data

Feb. 2, 1991 [DE] Fed. Rep. of Germany ....... 4103202

[51] Int. Cl.⁵ .......................... B62D 1/18; F16H 55/24
[52] U.S. Cl. ..................................... 74/493; 74/89.14; 74/396; 280/775
[58] Field of Search ...................... 74/89.14, 396, 398, 74/493; 280/775

[56] References Cited

U.S. PATENT DOCUMENTS

| 4,796,481 | 1/1989 | Nolte | 74/493 |
| 4,843,904 | 7/1989 | Moore | 74/396 |
| 4,903,540 | 2/1990 | Beauch | 74/493 |
| 4,987,791 | 1/1991 | Nakahashi et al. | 74/89.14 X |
| 5,010,779 | 4/1991 | Herron et al. | 74/493 |
| 5,090,261 | 2/1992 | Nakatsukasa | 74/425 X |

FOREIGN PATENT DOCUMENTS

| 3409986 | 8/1987 | Fed. Rep. of Germany . |
| 3532102 | 4/1990 | Fed. Rep. of Germany . |
| 3638162 | 7/1990 | Fed. Rep. of Germany . |
| 60-157963 | 8/1985 | Japan ...................................... 74/493 |

OTHER PUBLICATIONS

Abstract of Japanese Patent 61-108060(A) published May 26, 1986; Sakurai.

Primary Examiner—Allan D. Herrmann
Attorney, Agent, or Firm—McGlew and Tuttle

[57] ABSTRACT

The present invention pertains to a steering column for motor vehicles with an angle-adjustable steering wheel, in which a steering shaft has a lower shaft 1 and an upper shaft 2. These shafts are connected to one another by a universal joint 5 rotatably mounted in a housing. The housing has a lower housing 3, which is attached to the vehicle body, and an upper housing 4, which, in contrast, is movable about an axis transverse to the longitudinal axis 11 of the steering column. Both housings form adjustable connection links for the angle adjustment of the steering wheel by connection links which can be motor-driven. The connection link has a worm segment 10 attached to the upper housing 4 and a worm 12 motor-rotatably mounted on the lower housing 3.

6 Claims, 2 Drawing Sheets

STEERING COLUMN FOR MOTOR VEHICLES

FIELD OF THE INVENTION

The present invention pertains in general to an adjustable steering column for motor vehicles and in particular to a steering column having an upper and lower housing connected by a worm gear on the lower housing and a worm segment on the upper housing.

BACKGROUND OF THE INVENTION

A similar steering column is known from German Patent DE-PS 34 09 986. From this arises a structurally simple arrangement for the angle adjustment of a steering wheel by hand. In addition, a lower housing and an upper housing can be locked with one another in various positions by a connection link that can be actuated by hand from a vehicle guide rod. The connection link has special gear toothing, which acts together with individual teeth on the lower housing and on the upper housing. In the known arrangement, the lower housing and the upper housing are locked with one another in set positions of the steering wheel not only in a nonpositive manner, but also by positive interlocking elements. Thus, an essential safety requirement is fulfilled.

On the other hand, motor-driven, adjustable steering columns, and above all, those with continuous adjustability, are known, for example, from German patents DE-PS 36 38 162 and DE-PS 35 32 102. However, according to these publications, motor-driven, adjustable steering columns are essentially more complicated in structure, and in any case, do not fulfill the requirement for the positive connection of the two housings in the set position of the steering wheel.

SUMMARY AND OBJECTS OF THE PRESENT INVENTION

The task of the present invention is to produce a motor-drivable adjustment device of simple design with positively interlocking components for the angle adjustment of the steering wheel of a motor vehicle.

The present invention solves this task by having a worm segment substantially aligned with a longitudinal axis of the steering column. The center point of the worm segment is positioned substantially identical to the position of a center point for a universal joint connecting a lower shaft and an upper shaft.

Therefore, connection links connecting the upper housing to the lower housing consist only of a worm segment and a worm gear interlocking in the gear toothing of the worm segment. This worm gear is arranged on the lower housing which is mounted attached to the vehicle body, and the worm segment, which has only a few teeth available, is arranged on the movable upper housing. Thus, the moving bodies are kept small. The worm gearing between the movable upper housing and the lower housing, which is attached to the vehicle body, is self-locking in the direction of the forces originating from the upper housing. The self-locking is such that there is a positive connection of the upper housing to the lower housing in the direction of this flux of force, especially in any position of the upper housing opposite the lower housing. The adjustment is continuous and is produced with relatively small driving forces.

An essential advantage of this design consists in the fact that the connection links are easily manufactured and essentially also convey forces free from backlash. According to a special idea for the design of the present invention for optimizing the zero backlash, a design is provided where the worm of the worm gearing is mounted in a tube housing attached to the lower housing with a section for the passage of the worm gear toothing. The worm has bearings which can be axially braced against one another in the tube housing. In addition, the tube housing can be loaded with an initial stress in the contact zone of the worm gear toothing in the direction against the worm segment. Any possible backlash from the worm gearing connecting the upper housing to the lower housing can be eliminated by both adjustment possibilities.

One of the bearings for the worm gear can be made to axially screw into the tube housing in order to brace the bearings against one another and to axially stress the worm gear in order to eliminate backlash. An adjustment means can also be placed between the tube housing and a bell-shaped edge of the lower housing in order to bias the worm gear, inside the tube housing, against the worm segment on the upper housing. This adjustment means can take the form of a screw threaded into the bell-shaped edge and the tip of the screw applying pressure to the tube housing. The entire tube housing can be connected to the lower housing by having a screw thread on the tube housing and inserting the tube housing into a recess in the lower housing. An attachment nut can then be screwed onto the screw thread of the tube housing in order to mount the tube housing on the lower housing.

Finally, another advantage of the present invention is seen in that the worm lies with its axis essentially parallel to the longitudinal axis of the steering column, such that a driving motor can be coaxially coupled with the worm and is attached, in a very confined space, to the lower housing below the steering column.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
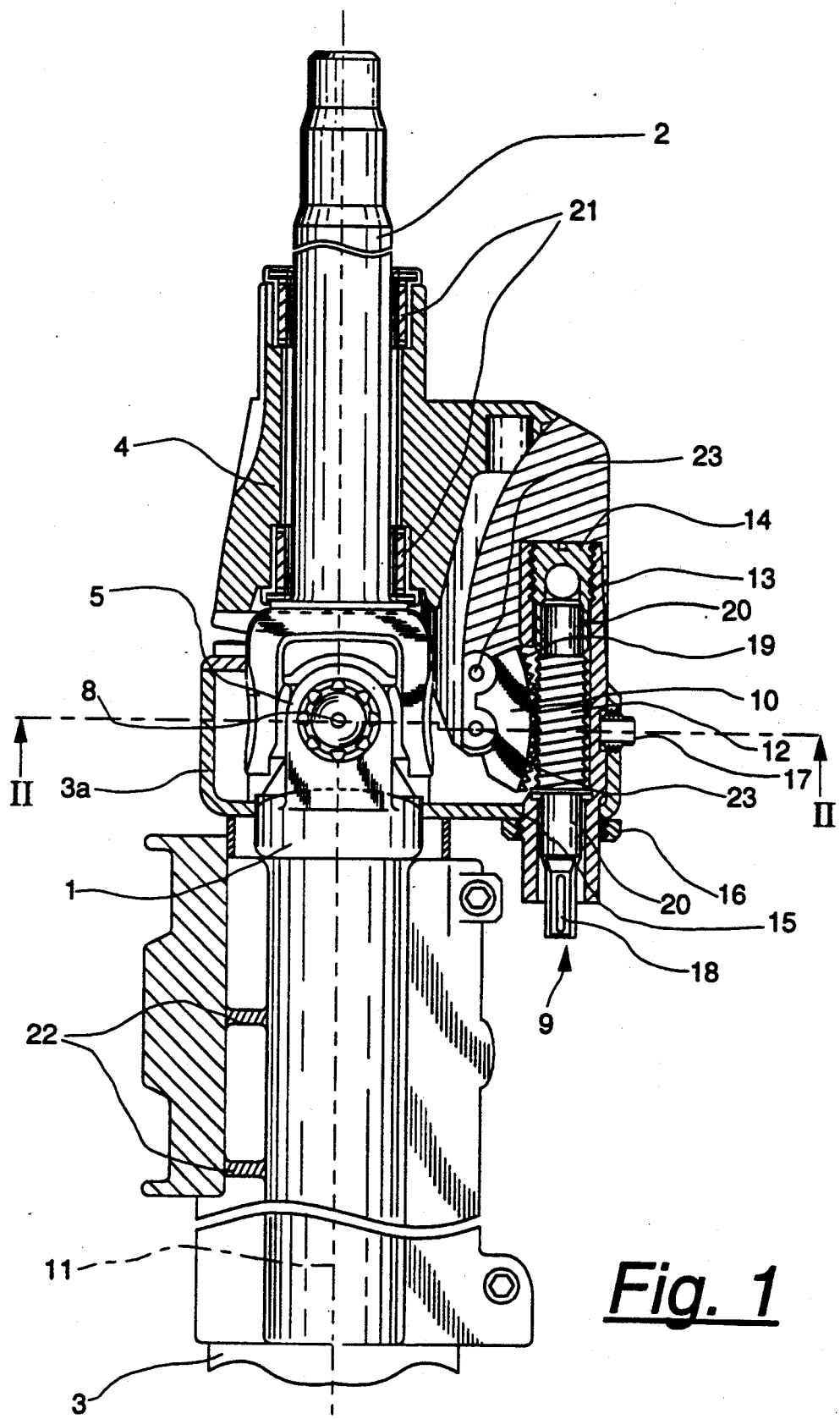
FIG. 1 shows a sectional view in an axial plane through the upper housing of a steering column with a partial lateral view of the lower housing.
Figure 2:
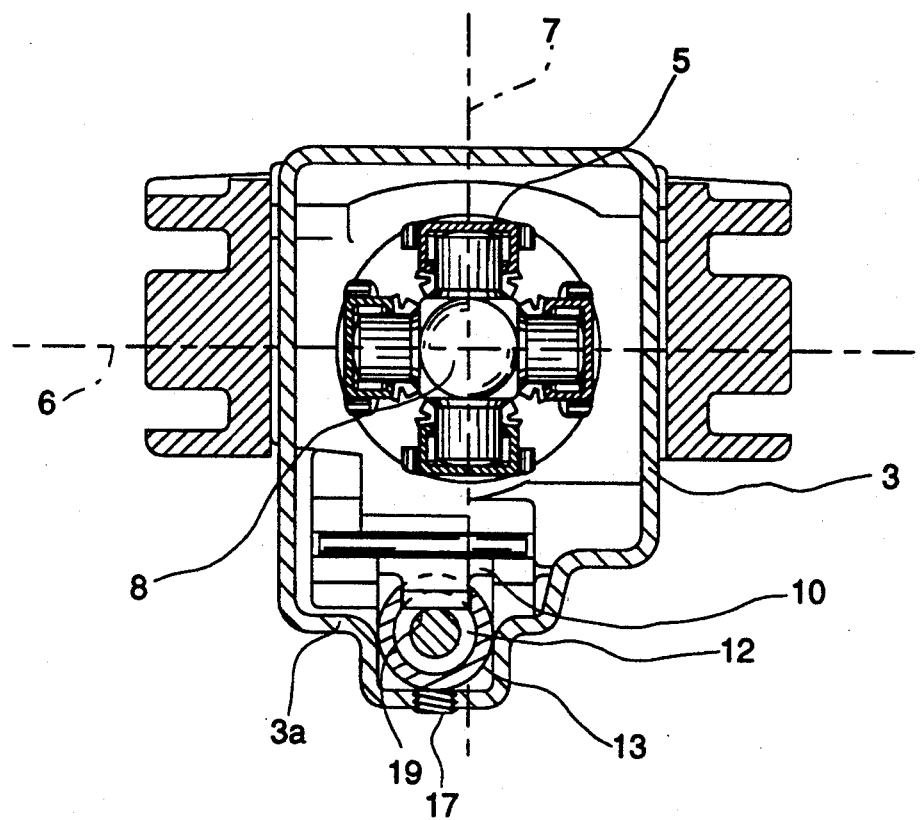
FIG. 2 shows a cross section according to line II—II in FIG. 1.

The exemplified embodiment shows a steering column, consisting of a lower shaft 1, an upper shaft 2, a lower housing 3 with elements 22 for rotatably supporting shaft 1 and an upper housing 4 with elements 21 for rotatably supporting shaft 2. The lower shaft 1 and the upper shaft 2 are connected to one another by a universal joint 5. The articulated axles 6 and 7 of the universal joint 5 lie in a transverse plane and intersect at a central point 8. As an example, a universal joint is shown with peg-shaped ends which are mounted in forked ends of the lower shaft 1 and of the upper shaft 2. However, the design of this universal joint is not the object of the present invention. The steering wheel of the motor vehicle (not shown in the drawing) can be attached on the upper free end of the upper shaft 2.

The lower housing 3 and the upper housing 4 are connected to one another by a worm gearing with the general reference number 9. This worm gearing consists of a worm segment 10 with pin 23, attached to the upper housing 4. The central point of worm segment 10 lies on the central point 8 of the articulated axles 6 and 7. The worm segment 10 is aligned parallel to the longitudinal axis 11 of the steering column. A worm 12, is rotatably mounted in a tube housing 13 by a bearing means 20 and is attached with this tube housing 13 to the lower housing 3. One bearing of this worm 12 is arranged in a bearing box 14 which is arranged axially and screw-connectable in the tube housing. The other bearing of the worm 12 is supported in the tube housing 13 against an inner ring shoulder, such that the worm 12 can be axially placed under stress by the screw connection of the bearing box 14 in order to eliminate any axial backlash from the mounting of the worm 12.

The tube housing 13 is set in a radially extending recess 15 of a bell-shaped, formed edge part 3a of the lower housing 3 and the tube housing 13 can be firmly screw-connected by means of an attachment nut 16. The tube housing 13 pulls an outer ring shoulder of the tube housing 13 against the bottom of the bell-shaped edge formation 3a of the lower housing 3. The tube housing 13 is supported radially inwards against the wall of the bell-shaped edge 3a of the lower housing 3. By means of an adjusting screw 17 which is rotatable in the wall of the bell-shaped edge 3a, an initial stress, radially directed to the central point 8, can be exerted on the tube housing 13 in order to balance a possible backlash between the worm 12 and the worm segment 10. The gear toothing of worm segment 10 passes through a section passage opening 19 of the wall of the tube housing 13.

Complementary links of a coupling connected to a driving motor can be slipped onto the coupling end 18 of the worm 12 which is led out on the tube housing 13 on its attachment side. For reasons of better overall view of the drawings, this driving motor is not shown.

While a specific embodiment of the invention has been shown and described in detail to illustrate the application of the principles of the invention, it will be understood that the invention may be embodied otherwise without departing from such principles.

What is claimed is:

1. An adjustable steering column comprising:
   a lower shaft;
   a universal joint connected to said lower shaft;
   an upper shaft connected to said universal joint;
   a lower housing rotatably supporting said lower shaft;
   an upper housing rotatably supporting said upper shaft;
   a worm segment firmly arranged on said upper housing, said worm segment having a center point located in an area of coordinate axes of said universal joint, said worm segment is substantially aligned with a longitudinal axis of said upper shaft;
   a tube housing mounted on said lower housing, said tube housing defining a passage opening in an area of said worm segment;
   a worm gear rotatably mounted in said tube housing and engaging said worm segment through said passage opening, rotation of said worm gear pivoting said upper housing substantially about said center point; and
   bearing means for rotatably supporting said worm gear in said tube housing and for axially bracing said worm gear against said tube housing in order to eliminate backlash.

2. A steering column in accordance with claim 1, wherein:
   said bearing means has a bearing box at an end of said tube housing, said bearing box having axial screw means for axially screwing said bearing box into said tube housing and axially stressing said worm gear.

3. A steering column in accordance with claim 1, wherein:
   said tube housing has a screw thread;
   said lower housing defines a recess for receiving said tube housing; and
   attachment nut means for engaging said screw thread of said tube housing for said mounting of said tube housing on said lower housing.

4. An adjustable steering column comprising:
   a lower shaft;
   a universal joint connected to said lower shaft;
   an upper shaft connected to said universal joint;
   a lower housing rotatably supporting said lower shaft;
   an upper housing rotatably supporting said upper shaft;
   a worm segment firmly arranged on said upper housing, said worm segment having a center point located in an area of coordinate axes of said universal joint, said worm segment is substantially aligned with a longitudinal axis of said upper shaft;
   a tube housing mounted on said lower housing, said tube housing defining a passage opening in an area of said worm segment;
   a worm gear rotatably mounted in said tube housing and engaging said worm segment through said passage opening, rotation of said worm gear pivoting said upper housing substantially about said center point; and
   adjusting means for adjusting radial stress of said worm gear against said worm segment.

5. A steering column in accordance with claim 4, wherein:
   said adjusting means has an adjusting screw means for applying pressure between said lower housing and said tube housing for forcing said worm gear radially against said worm segment.

6. A steering column in accordance with claim 5, wherein:
   said lower housing has a bell-shaped edge and said tube housing is attached to said bell-shaped edge, said adjusting means is positioned on said bell-shaped edge in area of said tube housing.

* * * * *